(12) United States Patent
Kamo

(10) Patent No.: US 8,804,314 B2
(45) Date of Patent: Aug. 12, 2014

(54) ELECTRIC JUNCTION BOX

(75) Inventor: Hiroaki Kamo, Makinohara (JP)

(73) Assignee: Yazaki Corporation, Tokyo (JP)

( * ) Notice: Subject to any disclaimer, the term of this patent is extended or adjusted under 35 U.S.C. 154(b) by 247 days.

(21) Appl. No.: 13/488,807

(22) Filed: Jun. 5, 2012

(65) Prior Publication Data

US 2013/0003264 A1  Jan. 3, 2013

(30) Foreign Application Priority Data

Jun. 30, 2011 (JP) ................. 2011-145662

(51) Int. Cl.
*H02G 3/08* (2006.01)
(52) U.S. Cl.
USPC ........................ 361/641; 439/76.2
(58) Field of Classification Search
USPC ................. 361/641; 439/76.1–76.2
See application file for complete search history.

(56) References Cited

U.S. PATENT DOCUMENTS

| | | | | |
|---|---|---|---|---|
| 4,909,745 A | * | 3/1990 | Hayashi | 439/76.2 |
| 7,291,025 B2 | * | 11/2007 | Yagi et al. | 439/76.2 |
| 7,314,376 B2 | * | 1/2008 | Yagi et al. | 439/76.2 |
| 7,335,035 B2 | * | 2/2008 | Shirota | 439/76.2 |
| 7,549,872 B2 | * | 6/2009 | Akahori et al. | 439/76.2 |

FOREIGN PATENT DOCUMENTS

| | | | |
|---|---|---|---|
| JP | 2007066662 A | * | 3/2007 |
| JP | 2008-199840 A | | 8/2008 |

* cited by examiner

*Primary Examiner* — Robert J Hoffberg
(74) *Attorney, Agent, or Firm* — Edwards Wildman Palmer LLP

(57) ABSTRACT

An electric junction box which can surly distribute electric power from a power source even if a electric power distributing unit is arranged is provided. The electric junction box includes a box main body; a power integration attached to the box main body and supplied with an electric power from a power source; and a block. The block includes a block main body formed separately from the box main body and attached to the box main body; and a terminal received in the block main body, attached to an end of an electric power cable connected to the power source, and connected to the power integration.

4 Claims, 8 Drawing Sheets

ELECTRIC JUNCTION BOX

The priority application Number Japan Patent Application No. 2011-145662 upon which this patent application is based is hereby incorporated by reference.

BACKGROUND OF THE INVENTION

1. Field of the Invention

The present invention relates to an electric junction box mounted on a vehicle as a moving object.

2. Description of the Related Art

Various electronic device, for example in general, lamps such as a head lamp and a tail lamp, and motors such as a starter motor and a motor for air conditioners, are mounted on a vehicle as a moving object.

The vehicle arranges an electric junction box in a suitable place so as to supply various electronic devices with electric power. The electric junction box is constructed by assembling various type electric circuits of a lot of fuses and relays.

Incidentally, the electric junction box has a fuse, a relay, a bus bar and the like. So, the electric junction box (for example, see Patent Document 1) is referred to as a fuse block, a relay box, or a junction block. In this description, the fuse block, the relay box and the junction block are collectively called the electric junction box hereafter.

The electric junction box disclosed in the Patent Document 1 has a box main body forming an outline thereof and a bus bar. The box main body is made of insulating synthetic resin, and formed in a box-shape. The box main body includes electric components such as a relay and fuse, an attachment portion on which a power integration as an electric power distributing unit are mounted, and a connector fitting portion to which a connector of a wiring harness is fitted. A power input portion which connects with a terminal installed in an end of an electric power cable connected to a power source is arranged in the power integration. Furthermore, the terminal installed in the end of the electric power cable is received in the box main body, and attached to the box main body.

The bus bar is made of conductive sheet metal, and arranged in the box main body. The bus bar is electrically connected to the electric components, the power integration and the connector of the wiring harness according to a predetermined pattern.

In the electric junction box, the bus bar electrically connects the power source, the electric components, the power integration and the electric wires of the wiring harness according to a predetermined pattern. The electric junction box supplies desired electric power to the respective electronic devices through the wiring harness.

In the electric junction box disclosed in the Patent Document 1, the power integration is constructed separately from the box main body. For this reason, the power integration is relatively moved against the box main body by vibration while the vehicle is moving. As a result, the terminal attached to the end of electric power cable received in the box main body and the power input portion of the power integration are relatively moved, and those connection are relatively moved and deviated. For this reason, electrically resistance value between the terminal and the power input portion is increased, and it is difficult to distribute electric power from the power source.

Accordingly, an object of the present invention is to provide an electric junction box which can certainly distribute electric power from a power source even if the electric junction box includes an electric power distributing unit.

[Patent Document 1]: Japan Published application No. 2008-199840

SUMMARY OF THE INVENTION

Objects to be Solved

In order to solve the above problem and attain the above objective, the present invention is a box main body; an electric power distributing unit attached to the box main body and supplied with an electric power from a power source; and a block having a block main body formed separately from the box main body and having a terminal received in the block main body. The block main body is attached to the box main body. The terminal being attached to an end of an electric power cable connected to the power source and connected to the electric power distributing unit.

Furthermore, a locking portion for locking in the box main body is arranged in the block main body.

Furthermore, an entry receiving tube receiving the block main body is arranged in the electric power distributing unit, and has an inner surface flatly formed.

According to the electric junction box of the present invention, the block main body of the block receiving in the terminal attached to the end of the electric power cable is formed separately from the box main body. As a result, a backlash is generated between the box main body and the block main body. Therefore, when the electric power distributing unit vibrates against the box main body, the terminal and the block main body vibrate following the electric power distributing unit.

Furthermore, since the locking portion for locking the box main body is arranged in the block main body, it is not required to provide the electric power distributing unit with construction for attaching the block main body of the block. Thus, construction of the electric power distributing unit can be simple.

Furthermore, since the inner surface of the receiving tube is flatly formed, construction of the electric power distributing unit does not become complex.

Effect of the Invention

According to the electric junction box of the present invention, when the electric power distributing unit vibrates against the box main body, the terminal and the block main body vibrate following the electric power distributing unit. For this reason, the terminal and a power input portion of the electric power distributing unit do not relatively vibrate, and these connections are not moved and deviated repeatedly. Therefore, the electric junction box prevents electrically resistance value between the terminal and the power input portion from increasing, and it is not difficult to distribute an electric power from the power source. Thus, even if the electric power distributing unit is provided, the electric junction box can steadily distribute the electric power from the power source.

Furthermore, the construction of the electric power distributing unit does not become complex in the electric junction box of the present invention. Thus, cost of the electric power distributing unit can be reduced.

The above and other objects and features of this invention will become more apparent from the following description taken in conjunction with the accompanying drawings.

DESCRIPTION OF THE PREFERRED EMBODIMENT

In the following, an electric junction box according to an embodiment of the present invention will be explained with reference to FIGS. 1 to 10. The electric junction box 1 shown in FIG. 1 in the embodiment is mounted on a vehicle as a moving object.

Figure 1:
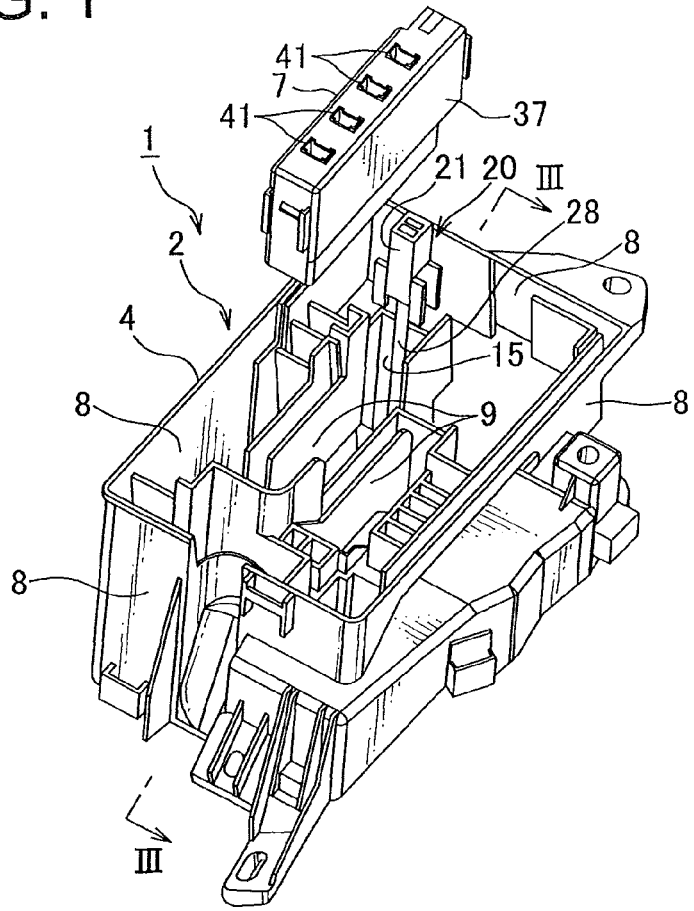
FIG. 1 is a perspective view of an electric junction box according to an embodiment of the present invention.
Figure 2:
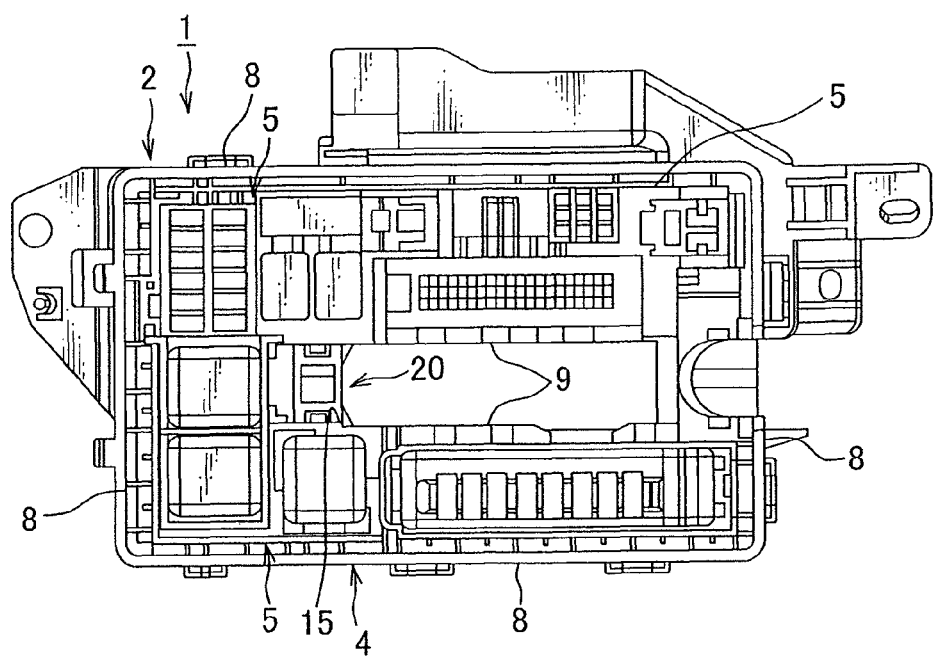
FIG. 2 is a plan view of the electric junction box in FIG. 1.

As shown in FIGS. 1 and 2, the electric junction box 1 includes a box main body 2, power integration (hereafter, integration) 7 as an electric power distributing unit, and a block 20.

Figure 3:
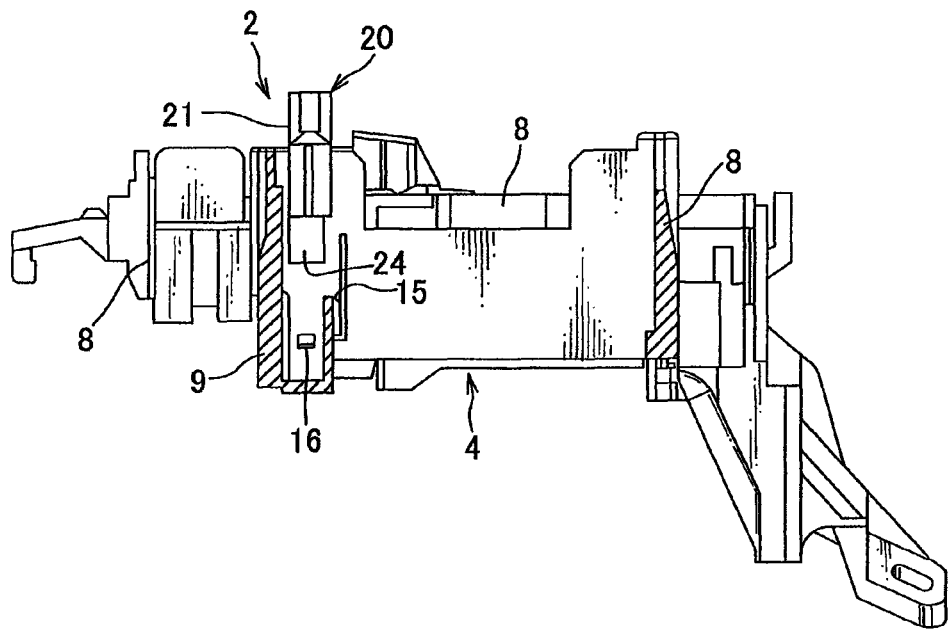
FIG. 3 is a cross-sectional view showing a state attaching the block to a main body portion of a box main body of the electric junction box in FIG. 1.

As shown in FIG. 2, the box main body 2 includes a main body portion 4, a cassette block 5, a upper cover (not shown in the figure), and a lower cover (not shown in the figure). The main body portion 4 is made of electrically insulating synthetic resin and molded by means of known injection molding. As shown in FIG. 2, the main body portion 4 is formed in a tube-shape with a plurality of outer walls 8 which continue to each other. Furthermore, the main body portion 4 is provided with a partition wall 9 which partitions the body part 4. In addition, a tubular block receiving portion 15 for receiving a block 20 is arranged in the main body portion 4. As shown in FIG. 3, the block receiving portion 15 is provided with a locking projection 16 projecting from the inner surface opposed to each other.

The cassette block 5 is made of electrically insulating synthetic resin and formed in a box-shape. An upper surface of the cassette block 5 shown in FIG. 2 is provided with a mounting portion, on which electrical components such as a relay and fuse are mounted, while a lower surface of the cassette block 5 shown in FIG. 2 is provided with a connector fitting portion, on which a connector of a wiring harness (not shown in drawings) is fitted.

The cassette block 5 is provided with a terminal attaching portion in which a terminal, which is attached to an end of an electric power cable connected to a power source, is attached. Furthermore, the cassette block 5 receives a bus bar which electrically connects electric components mounted on the mounting portion such as the above cassette block to a terminal of the connector of the wiring harness fitted to the connector fitting portion according to a predetermined pattern.

The wiring harness includes a plurality of electric wires and connectors attached to ends of the electric wires. The connector fits to the connector fitting portion described above, a connector fitting portion 42 (explained later), and various electronic instruments mounted on a vehicle.

The upper cover is made of electrically insulating synthetic resin and molded by means of known injection molding. The upper cover is formed in a tube-shape having a bottom with a plurality of outer walls which continue to each other. The upper cover is attached to the main body portion 4 in such a manner that the upper cover covers an upper surface of the main body portion 4.

The lower cover is made of electrically insulating synthetic resin and molded by means of known injection molding. The lower cover is formed in a tube-shape having a bottom with a plurality of outer walls which continue to each other. The lower cover is attached to the main body portion 4 in such a manner that the lower cover covers a lower surface of the main body portion 4.

The electrical components such as the relay or fuse are mounted on the main body portion 4 and on the cassette block 5 mounted on the main body portion 4, the connectors of the wiring harness are fitted to the main body portion 4 and to the cassette block 5, the terminals are attached to the terminal attaching portion, and the upper cover and the lower cover are attached to the main body portion 4, whereby the box body 2 receives the electrical components such as the relay or fuse and the terminals.

Figure 8:
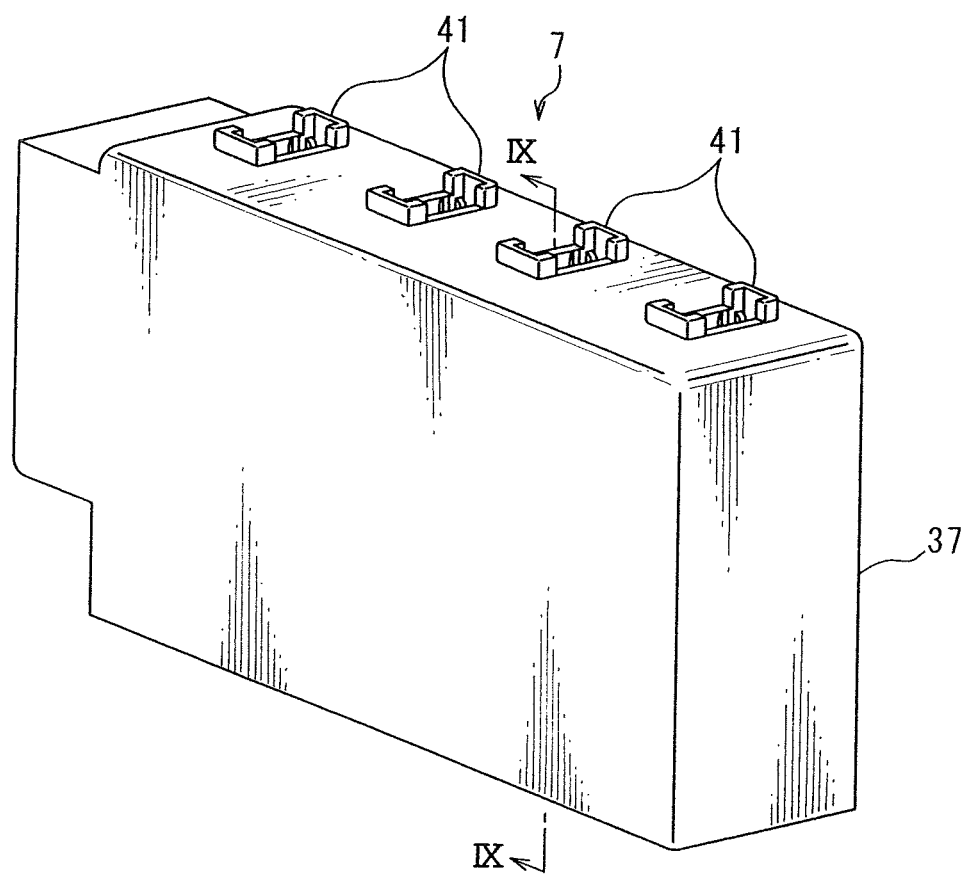
FIG. 8 is a perspective view showing the integration of the electric junction box in FIG. 1.
Figure 9:
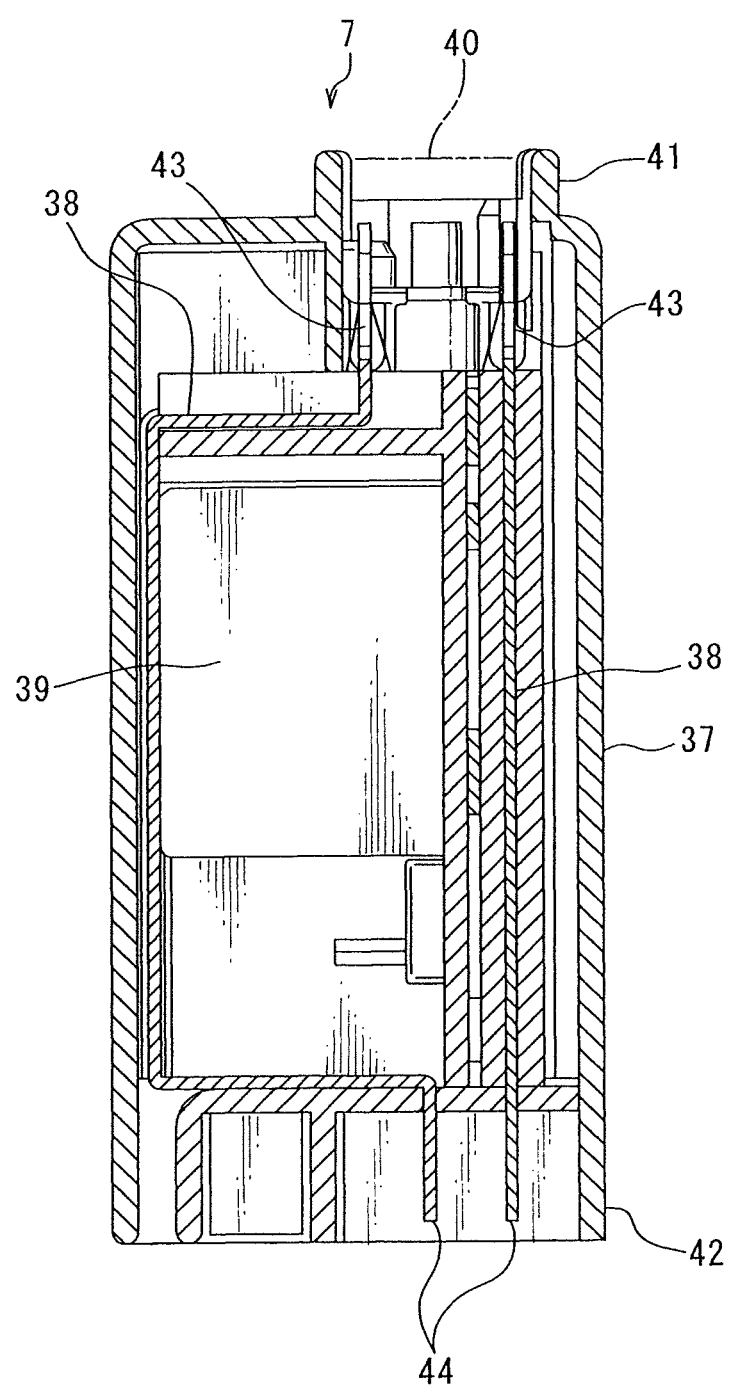
FIG. 9 is a cross-sectional view taken along the line IX-IX in FIG. 8.

As shown in FIGS. 8 and 9, the integration 7 includes a case 37, a pair of bus bars 38 (shown in FIG. 9), a plurality of relays 39 (one relay is shown in FIG. 9), a plurality of fuses 40 (one fuse is shown in FIG. 9).

The case 37 is made of electrically insulating synthetic resin and formed in a flat box-shape. An upper surface of the case 37 shown in FIG. 8 is provided with a fuse mounting portion 41 on which the fuse 40 is mounted, while a lower surface of the case 37 shown in FIG. 8 is provided with a connector fitting portion 42 shown in FIG. 9 on which the connector of the wiring harness is fitted. Furthermore, the case 37, namely, the integration 7 is positioned between the partition walls 9 of the main body portion 4 of the box main body 2, and received in the main body portion 4.

The pair of the bus bars 38 is made of electrically conductive sheet metal. Each of the bus bars 38 includes a fuse connecting terminal portion 43 which is positioned within the fuse mounting portion 41 and connected to the fuse 40, and a connector connection terminal portion 44 which is positioned within the connector fitting portion 42 and connected to the connector of the wiring harness.

Figure 10:
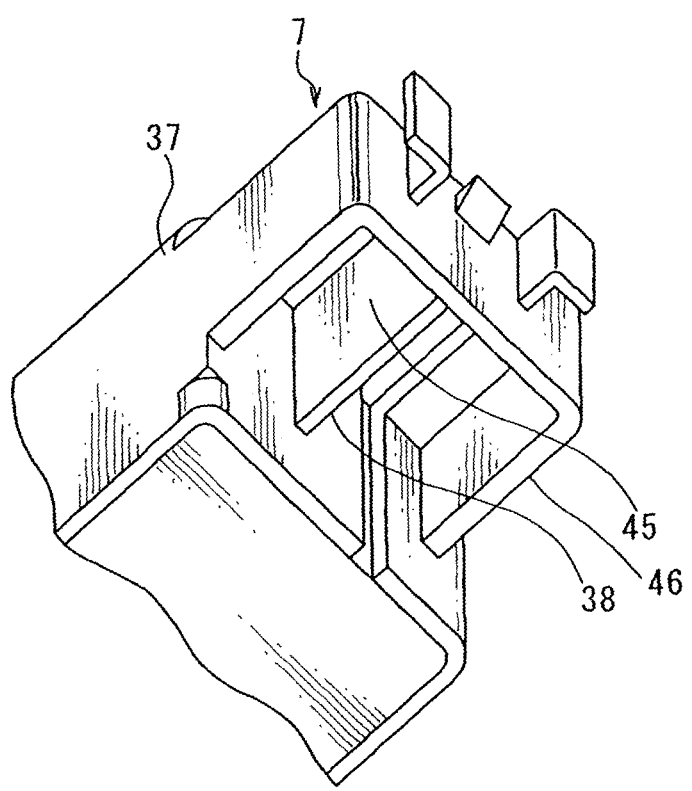
FIG. 10 is a perspective view showing a main portion of the integration in FIG. 8 from the bottom.

One bus bar 38 integrally includes a connecting piece 45 shown in FIG. 10 as an electric power inputting portion which is connected to a terminal 22 (explained later) of the block 20 when the integration 7 is received in the main body portion 4. The connecting piece 45 is received in a tubular receiving tube 46 integrally arranged in the case 37. In drawings of the embodiment, an inner surface of the receiving tube 46 is formed in a flat square-tube shape.

The relay 39 is attached to the one bus bar 38. The fuse 40 is attached to the fuse mounting portions 41 so as to connect the fuse connecting terminal portions 43 of the pair of the bus bars 38 to each other. Each fuse 40 corresponds to each relay 39.

When the integration 7 is received in the main body portion 4 of the box main body 2, the connecting piece 45 of one bus bar 38 is supplied with electric power from the power source through the terminal 22 of the block 20. Then, the one bus bar 38 distributes the electric power and applies the electric power to the fuse 40 and the other bus bar 38 in turn through the relay 39. Then, the integration 7 provides the distributed electric power applied to the relay 39 and the fuse 40 in turn to the electronic instruments through the connectors of the wiring harness fitted to the connector fitting portion 42. Thus, the integration 7 distributes the electric power supplied from the power source to the respective electronic instruments.

Figure 6:
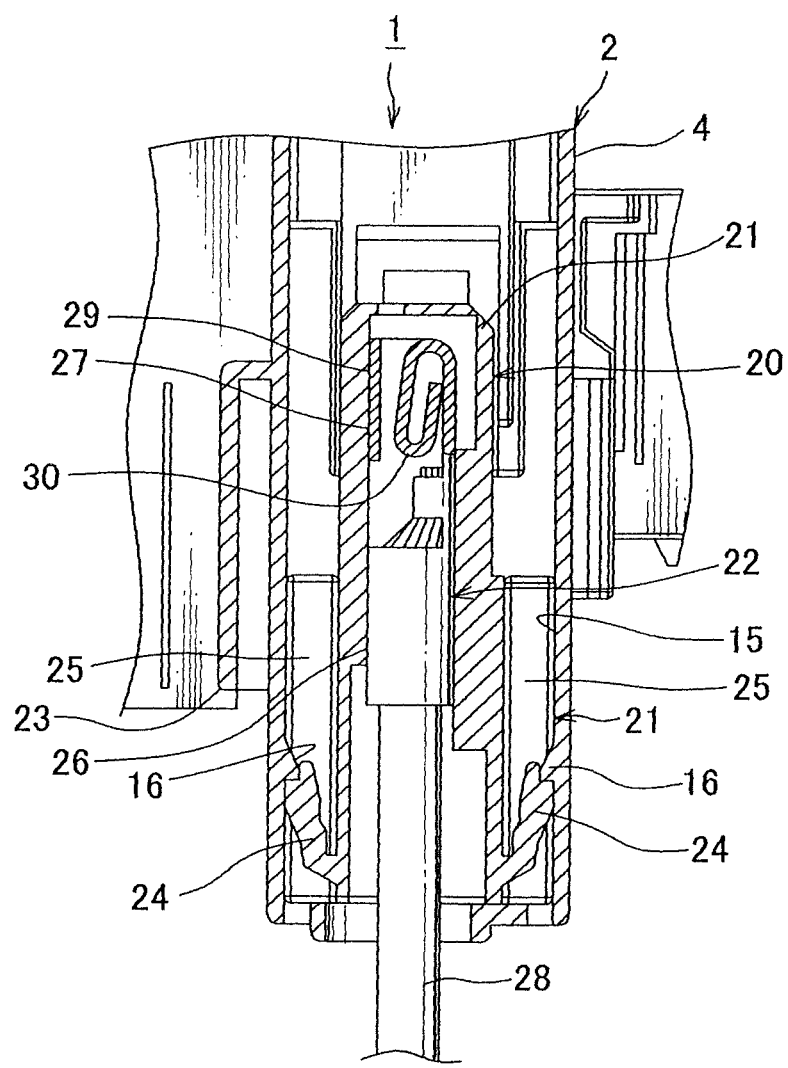
FIG. 6 is a cross-sectional view taken along the line VI-VI in FIG. 2.
Figure 7:
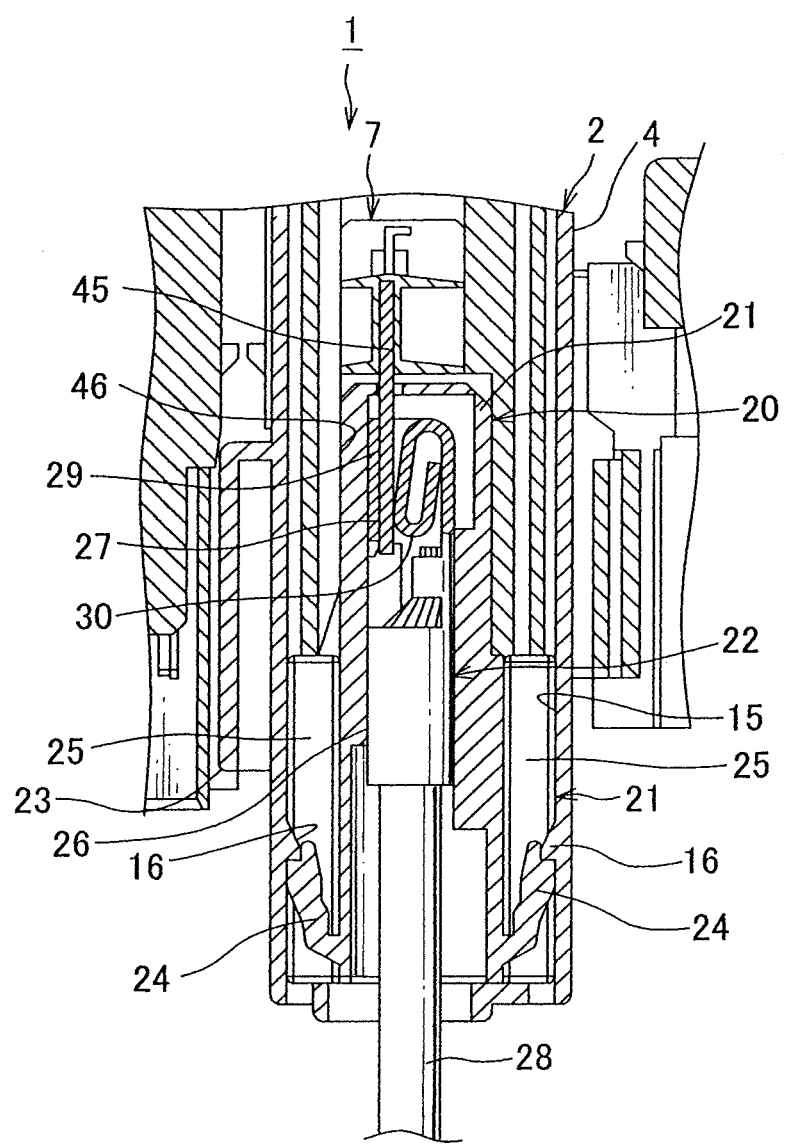
FIG. 7 is a cross-sectional view a state connecting the integration to the block in FIG. 6.

As shown in FIGS. 6 and 7, the block 29 includes a block main body 21 formed separately from the main body portion 4 of the box main body 2 and a terminal 22. The block main body 21 is made of electrically insulating synthetic resin, and includes a tubular main body portion 23, a pair of locking arms 24 as a locking portion, and a guide wall 25. The main body portion 23 is formed in a square-tube shape. The pair of the locking arms 24 are arranged in outer surfaces positioned behind the main body portion 23, respectively. One end portion of the locking arm 24 continues to an edge of a lower surface of the main body portion, while the other end portion of the locking arm 24 is a free end. The locking arm 24 is formed in an arm-shape so that the other end portion is gradually inclined from the one end portion toward the upper surface in a direction away from the main body portion 23. When the block 20 is received in the block receiving portion 15, the locking arm 24 is locked in the projection 16. Each guide wall 25 is linearly extended along a longitudinal direction of the main body portion 23, and the locking arm 24 is located between the guide walls 25.

The terminal 22 is made of conductive sheet metal, and integrally includes a cable connecting portion 26 and an electric contacting portion 27. An end of an electric power cable 28 which is connected to the power source is attached to the cable connecting portion 26. The electric contacting portion 27 includes a main body portion 29 formed in a tube-shape, and a spring piece 30 arranged in the main body portion 29. The electric contacting portion 27 is electrically connected to the connecting piece 45, namely, the integration 7 by sandwiching the connecting piece 45 between the spring piece 30 and the inner surface of the main body portion 29. That is, the terminal 22 electrically connects the electric power cable 28 and the integration 7.

Figure 4:
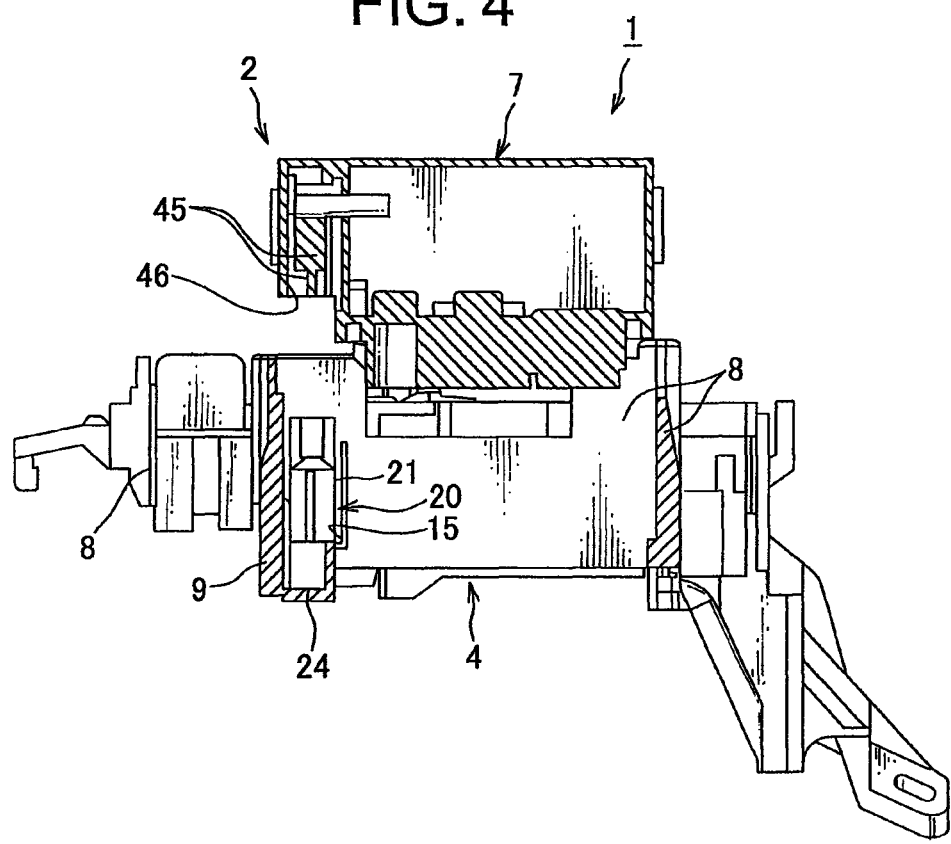
FIG. 4 is a cross-sectional view showing a state attaching an integration to the main body portion of the box main body of the electric junction box in FIG. 3.

As described below, the block 20 having the construction described above and the integration 7 are attached to the main body portion 4 of the box main body 2. First, the block 20 receives the terminal 22, in which the end of the electric power cable 28 is attached, in the block main body 21 and is assembled. Then, as shown in FIG. 3, the block 20 is inserted in the block receiving portion 15 of the main body portion 4 of the box main body 2 from the upper surface side. As shown in FIG. 4, the locking arm 24 is locked in the projection 16, and the block 20 is attached to the main body portion 4 of the box main body 2.

Figure 5:
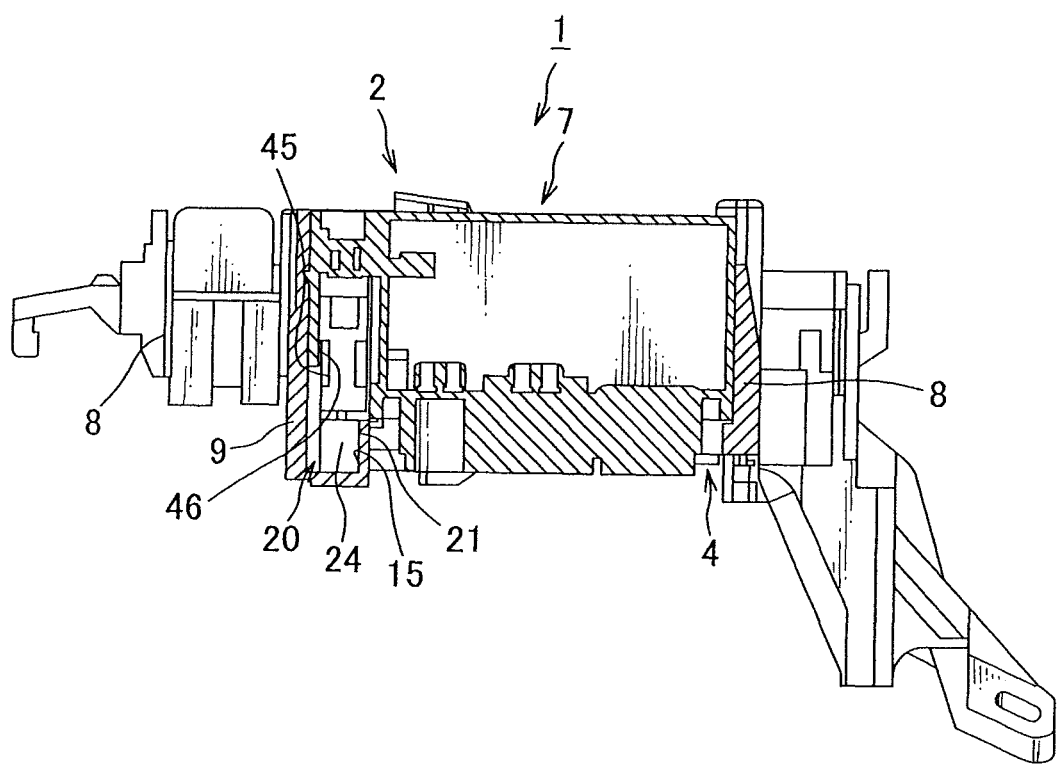
FIG. 5 is a cross-sectional view showing a state after the integration is attached to the main body portion of the box main body of the electric junction box in FIG. 4.

Thereafter, as shown in FIG. 4, the integration 7 is inserted in the block receiving portion 15 of the main body portion 4 of the box main body 2 from the upper surface side. Then, as shown in FIG. 5, the integration 7 is attached to the main body portion 4 of the box main body 2. As a result, as shown in FIGS. 5 and 7, the terminal 22 of the block 20 and the connecting piece 45 are electrically connected, and electric power from the power source is supplied to the integration 7.

The cassette block 5 and the integration 7 are mounted on the main body portion 4, various electrical components and fuses 40 are attached to the mounting portions and the fuse mounting portions 41, and the connectors of the wiring harness fit to the connector fitting portion 42, so that the electric junction box 1 electrically connects the power source, electrical components, fuses 40, relays 39, and various electronic instruments connected by means of the wiring harness to one another according to a predetermined pattern. Then, the electric junction box 1 supplies the electric power from the power source to the various electronic instruments through the electrical components, fuses 40 and the relays 39.

According to the embodiment described above, since the block main body 21 of the block receiving the terminal 22 attached to the end of the electric power cable 28 is constructed separately from the box main body 2, a backlash is generated between the box main body 2 and the block main body 21. As a result, when the integration 7 vibrates against the box main body 2, the terminal 22 and the block main body 21 vibrate following the integration 7. Therefore, the terminal 22 and the connecting piece 45 as the power input portion do not relatively vibrate, and this connection is not moved. For this reason, electrically resistance value between the terminal 22 and the connecting piece 45 as the power input portion is not increased. Thus, even if the integration 7 is arranged, the electric junction box of the present invention can surely distribute the electric power from the power source.

Furthermore, since the locking arm 24 locked in the main body portion 4 of the box main body 2 is arranged in the block main body 21, it is not required to arrange construction for installing the block main body 21 of the block 20 in the integration 7. Thus, construction of the integration 7 does not become complex. Furthermore, since the inner surface of the receiving tube 46 in which the block main body 21 is inserted is flatly formed, the construction of the integration 7 can be simple. Therefore, cost of the integration 7 can be saved.

The aforementioned preferred embodiments are described to aid in understanding the present invention and variations may be made by one skilled in the art without departing from the spirit and scope of the present invention.

What is claimed is:

1. An electric junction box comprising:
a box main body;
an electric power distributing unit formed separately and attached to the box main body and supplied with an electric power from a power source; and
a block having a block main body formed separately from the box main body and having a terminal received in the block main body, the block main body being attached to the box main body, the terminal being attached to an end of an electric power cable connected to the power source and connected to the electric power distributing unit.

2. The electric junction box according to claim 1, wherein a locking portion for locking in the box main body is arranged in the block main body.

3. The electric junction box according to claim 2, wherein an entry receiving tube receiving the block main body is arranged in the electric power distributing unit, and has an inner surface flatly formed.

4. The electric junction box according to claim 1, wherein an entry receiving tube receiving the block main body is arranged in the electric power distributing unit, and has an inner surface flatly formed.

* * * * *